United States Patent [19]

Turner

[11] Patent Number: 4,790,471

[45] Date of Patent: * Dec. 13, 1988

[54] METHOD OF CLADDING TUBING AND PLATE PRODUCTS

[76] Inventor: William C. Turner, 85 Pinto La., Sedona, Ariz. 86336

[*] Notice: The portion of the term of this patent subsequent to Nov. 4, 2003 has been disclaimed.

[21] Appl. No.: 920,681

[22] Filed: Oct. 20, 1986

Related U.S. Application Data

[63] Continuation-in-part of Ser. No. 694,347, Jan. 24, 1985.

[51] Int. Cl.$^4$ .............................................. B23K 1/00
[52] U.S. Cl. ..................... 228/131; 228/133; 228/186
[58] Field of Search .............. 228/131, 133, 186, 134

[56] References Cited

U.S. PATENT DOCUMENTS 2,508,466   5/1950   Brace ................................ 228/134

FOREIGN PATENT DOCUMENTS 055199   1/1973   Japan ................................ 228/133
0100890  8/1980   Japan ................................ 228/186

Primary Examiner—Kurt Rowan
Attorney, Agent, or Firm—Head & Johnson

[57] ABSTRACT

A method of cladding a base plate of carbon steel, including the steps of plating by electroless deposition the faying surface of the plate slab, positioning a cladding plate on the plated faying surface, welding both plates together at three edges to form a seal, attaching a gas reservoir at the fourth side thus forming a sealed subassembly, evacuating the space formed in the subassembly between the two plates of water vapor and oxygen, heating the subassembly to about 1650° to 2100° F. thereby melting the bonding metal alloy, and hot rolling the heated subassembly to metallically bond the cladding plate to the steel plate by means of the mechanism of liquid interface diffusion bonding.

17 Claims, 2 Drawing Sheets

METHOD OF CLADDING TUBING AND PLATE PRODUCTS

CROSS-REFERENCE

This is a continuation-in-part of application Ser. No. 694,347 filed Jan. 24, 1985, entitled "Method of Manufacturing An Internally Clad Tubular Product."

SUMMARY OF THE INVENTION

The present invention is directed towards a greatly improved method of manufacturing clad steel members, including specifically, tubular members and plate members. Clad plate essentially consists of a thick carbon steel substrate metallically bonded to a thin plate of corrosion resistant alloy. The alloy is generally of nickel base, but by using this invention, it could be of titanium or zirconium base. Clad plate is needed for vacuum vessels. A host of other applications are better served by use of clad plate. Plate clad by the method of this invention possesses such high strength and reliability as to be readily formed and submerged are welded into pipe.

Clad plate is currently made in the United States in a rather out-of-date manner. Both plates are cleaned by pickling and one faying surface is coated by electrolytic nickel plating. The two plates are assembled together and hot rolled, at very high pressures, high temperatures, high reduction ratios. The high pressure is required to off-set contamination of the faying surfaces that occurs during processing and to achieve a diffusion bond. The high temperature is required in addition to high pressure in order to obtain a metallic diffusion bond in the absence of a liquid interface. The nickel coating is used to limit carbon diffusion from the steel into the clad. The nickel coating must be in a solid state at rolling temperature to do so. The nickel coating is indeed solid phase, melting only at a temperature above the melting point of the steel. By its very nature of electrolytic deposition, the nickel coating introduces sulfur contamination.

The currently used process is sufficiently unreliable as to result in very high costs for clad plates. Rejection rate is high. Bond strengths are low—in the order of 28,000 PSI. An industrial rule-of-thumb is that clad plate averages 80% of the cost of a homogeneous plate of the clad alloy alone of this same size and thickness.

This disclosure concerns a process of liquid interface diffusion bonding. The liquid interface requires clean conditions, based on pre-cleaning and an inert atmosphere. The liquid interface allows light rolling pressures and reduced temperatures, so much so that no plastic reduction of thickness is required. Furthermore, the lower temperature prevents any detectable carbon diffusion. The resultant metallic bond is of great strength, in excess of 85,000 PSI tensile. This strong bond permits subsequent routine hot rolling of clad plate to finished sizes. It permits routine heat treating, if desirable for the specific steel substrate. This process allows for all faying surfaces to be as rolled, with no need for special finishing prior to bonding. Rejection rate will be zero. This method uses the same basic solid state physics approach as the process described in the parent application.

In Japan, a better cladding process is in use than the present state-of-the-art in America. This Japanese process has been developed by Nippon Steel Co. An inert atmosphere is attained by welding together the substrate plate and cladding plate into a subassembly in the excellent vacuum of an electron beam welder. No activator is used. Plastic deformation is required to achieve a metallic bond. Bond strengths are understood to be low, typically 40,000 PSI. Reliable, high strength bonds are only achieved by very high rolling pressures.

The present invention is directed to a technically different approach in that all details are aimed at using, and meeting the requirements of, liquid interface diffusion bonding (LIDB).

A better understanding of the invention will be had by reference to the following description and claims, taken in conjunction with the attached drawings.

DESCRIPTION OF THE PREFERRED EMBODIMENTS OF THE INVENTION

This invention is directed to methods of cladding metal products, particularly it is directed to methods of cladding tubular and plate products. The method of internally cladding a tubular product will be first described.

While the invention may be practiced in other ways, it will first be described as it is particularly applicable to the manufacture of internally clad tubular products in conjunction with the well known method of manufacturing seamless tubing in a mandrel mill. In a mandrel mill seamless tubing is manufactured by first producing by casting a solid cylindrical billet which is heated in a rotary hearth furnace. The billet is then longitudinally pierced by a piercer to form a hollow shell. This hollow shell is rolled in a mandrel mill thus forming what is referred to as "mother" pipe. The mother pipe is, while still heated, formed to the required diameters by stretch reducing.

This invention starts with the round billet after it has been pierced to produce a hollow shell which forms a tubular host. In some manufacturing processes the billet is "pierced" twice and in this case the hollow shell or host product will be employed after the second "piercing".

Figure 1:
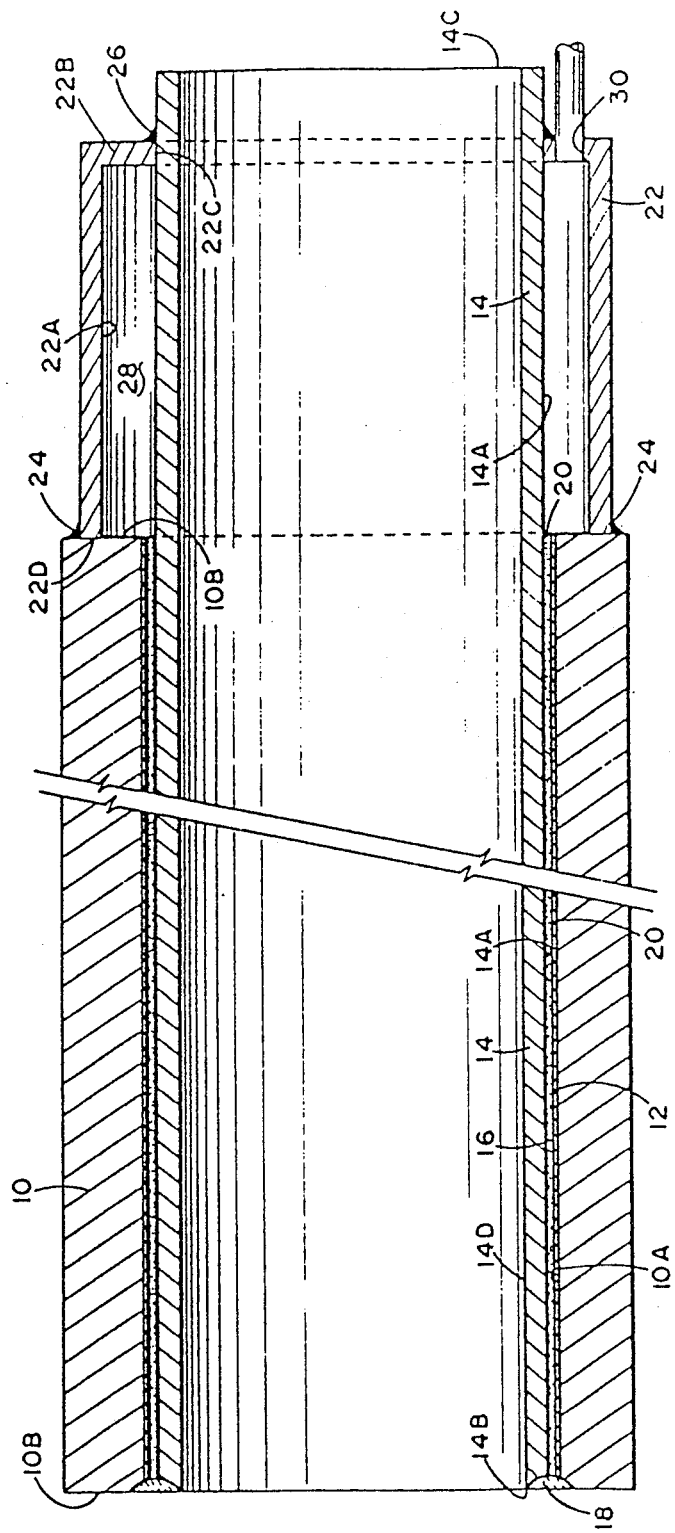
FIG. 1 is a fragmentary cross-sectional view of a subassembly as employed in the method of manufacturing internally clad tubular products showing the stage in the process in which the subassembly is ready to be heated and hot rolled in a mill.

Referring to FIG. 1, the hollow tubular host is indicated by the numeral 10 and is typically formed of steel having the prescribed composition according to the ultimate intended use of the tubular product. The tubular host is of diameter greater than the ultimate diameter of the tubular product and of length less than the ultimate length of the finished tubular product. In addition, the wall thickness is greater than will be found in the finished product.

The tubular host 10 is removed from the standard mandrel mill process and the internal surface 10A is plated with a layer of a low melting point bonding metal alloy 12. This is best achieved by submerging the tubular host 10 in a cleaning bath followed by an electroless plating bath.

The low melting point bonding metal alloy may be nickel phosphorous, nickel boron, nickel chromium phosphorous, chromium phosphorous or mixtures of these alloys. A preferred alloy is nickel phosphorus composed of about 88 to 98 percent by weight nickel and about 2 to 12 percent by weight phosphorous. In some instances, an additional wetting aid is helpful and in such cases about 0.5 to 1 percent by weight boron may be employed in the plating alloy. The depth of the plating is not critical but may be to a thickness of about 0.0005 to about 0.002 inches. The exact composition will be determined by the hot rolling parameters.

A tubular cladding member 14 is next telescopically inserted into the plated host member 10. The tubing cladding member 14 has an external diameter 14A which is slightly less than the internal diameter 10A of the tubular host so that the cladding member slides freely into position within the host. In some instances it is desirable that a flux be employed, and if so, the flux will probably be applied to the external cylindrical surface 14A of the tubular cladding member. While other flux materials may be utilized a preferred material is cryolite.

The metallurgical terminology surfaces to be metallically joined are called "faying" surfaces. Thus, in the embodiment of this invention, as illustrated and described, the host cylindrical, internal surface 10A with the bonding metal alloy 12 plated thereon is one faying surface and the exterior surface 14A of the tubular cladding member, with or without a flux 16 thereon, is the other faying surface.

After insertion of the tubular cladding member 14 the first end 14B is welded to the host member 10 adjacent its first end 10B. The welding 18 is around the full circumference of the cladding member 14 and the host member 10B to form an airtight seal. The welding 18 does not have to be accomplished exactly at the end of the cladding member 14, that is, the cladding member 14 would probably extend somewhat beyond the end 10B of the host member. The essence of the welding step is to seal one end of an annular space 20 between the internal surface 10A of the host member and the exterior 14A of the cladding member, which annular space is closed at the other end by welding so as to incorporate the gas reservoir and seal the faying surfaces. The weld at the first end will also be structural and will transfer stresses between the two cylinders during rolling.

The next step is to remove from the annular space 20 water vapor and oxygen. This is achieved by first applying a vacuum to the annular space 20. One means of providing closed communication with the annular space is by the use of the circumferential bag 22. While the element 22 is referred to as "bag" or reservoir it is preferably of metallic material of an internal diameter at least equal to the internal diameter 10A of the tubular host. Bag 22 has a portion 22A. With the bag 22 in place a weld 24 is applied around the entire circumferential end 22D of the bag to seal it to the second end 10C of the host. A second weld 26 is then circumferentially applied to affix the bag tot he external surface 14A of the cladding member. With the bag 22 thus welded in place closed communication is provided between the annular space 28 within the bag and the annular space 20 between the tubular host and the tubular cladding member.

A small diameter opening 30, which could be a pinch tube, is formed in bag 22 by which piping (not shown) may be attached.

By means of piping (not shown) the annular spaces 20 and 28 are subjected first to a vacuum to pull air from between the interior surface 10A of the host member and the exterior surface 14A of the cladding member.

Next, an inert gas, such as argon, is injected through the opening 30 to enter in and fill the annular space 20.

It is imperative that the annular space 20 between the interior surface of the host pipe and the exterior surface of the cladding member be substantially free of water and oxygen. By "substantially free" is meant that the space should be under conditions such that the water and oxygen dew point is at −60° F. or below. To achieve this result the space may have to be evacuated, filled with inert gas, evacuated and refilled several times. When the water and oxygen levels in the annular space have been reduced to the accepted level the pressure of inert gas remaining in the annular space can be relatively low and preferably is that which is sufficient to help support the bag, that is resist collapsing of the bag, during the subsequent steps of heating and rolling the subassembly. AT this step, a quantity, such as 5 wt. percent hydrogen may be added to the inert gas.

The host member with its inserted tubular cladding member 14 welded at 18 and with the bag 22 in position and welded at 24 and 26 forms a subassembly. After evacuation and filling the annular space 20 with an inert gas as above described, the subassembly is ready for the final stages of forming a cladded tubular member. The subassembly may now be returned to the mill and succeeding steps are employed as with a pierced billet completing the manufacture of a seamless tubular item. The subassembly is heated to a temperature at which bonding under pressure effectively occurs.

The essence of this invention is the application of liquid interface diffusion bonding to achieve metallic bonding of tubular products within the customary practices of hot rolling. LIDB requires temperatures above 1650° F., some contact pressure, and very clean conditions. The nickel base alloy can not be exposed to air above 2200° F. For this reason, the subassembly is heated to a temperature at which the bonding metal alloy 12 melts, which is in the range of about 1650° F. to 2100° F. When the bonded metal alloy is nickel phosphorus, the subassembly is heated to about 1950° F.

In the exemplary application of the invention wherein a cladded pipe is manufactured on a mandrell mill, a mandrel is inserted into the heated subassembly and pressure is applied between the tubular cladding member 14 and host member 10 to metallically bond the two materials together; that is, after the subassembly is heated to the required temperature. It is hot rolled by a bank of opposing rolls to metallically bond the cladding member 14 to the host member internal surface 10A. The host member is now internally clad. Thereafter, the clad tubular member is passed through the normal steps employed in manufacturing seamless pipe on a mandrel mill; that is stretch reduced to provide the preselected internal and external diameters and lengths. Afterwhich, the clad pipe is cut to length, straightened, inspected, heat treated and so forth.

The use of bag 22 greatly facilitates the practice of important steps in the invention; that is, the bag makes it easy to remove oxygen and water from the annular space 20 and to prevent the reintroduction of such contaminants during heating in a non-atmosphere controlled furnace and during rolling. Additionally, the bag will expand during rolling in such a manner as to accept all gases being displaced from between the faying surfaces. After the cladding step has been completed, portions of the tubular cladding member 14 extending beyond the ends of the tubular host, and the bag 22, will be cut off and discarded. Thus, the bag 22 will be used only one time. Bag 22 does not need to have the shape illustrated. It may be arcuate in cross-sectional configuration, or it may be of a truncated conical shape. All that is necessary is an apparatus suitable to the tasks already listed.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

Figure 2:
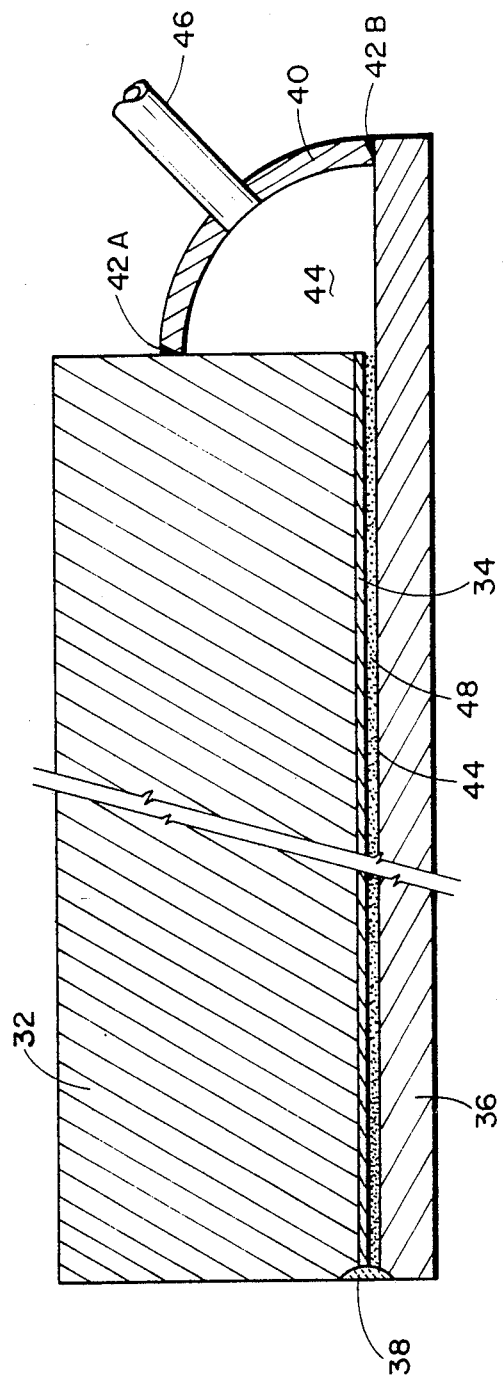
FIG. 2 is a fragmentary cross-sectional view of two plates as assembled and prepared for liquid interface diffusion bonding by the principles of this invention.

The application of the principles of the invention to the method of manufacturing a clad steel plate is illustrated in FIG. 2. The object of the invention is to apply a cladding layer to one surface of steel plate 32. The plate can be selected at any point in the rolling process, as best suits rolling efficiencies. A bonding metal alloy 34 is applied to plate slab 10 by electroless deposition. The composition of the bonding metal alloy is the same as that used to clad a tubular member as previously described. The cladding plate 36 is welded as at 38 to three edges of the plate 32. While only one welded edge is shown in FIG. 2 it is understood that the two opposed edges perpendicular to the edge having weld 38 are welded in like manner.

Space 44 between the plates 32 and 36 and within the gas bag is evacuated through a tube 46 by vacuum purging. Space 44 is back filled with an inert gas, such as argon and repurged, in order to obtain a purity of −60° F. dewpoint, as required for liquid interface diffusion bonding all as previously described.

As in cladding a tubular product, a flux 48 may be provided and if so, it may be applied to the faying surface of the cladding palte 36 or to the bonding metal 34 before assembling the plates together and before welding. Flux 48 if required, can be of the type previously described with reference to FIG. 1.

The subassembly consisting of steel plate 32 welded at three edges to cladding plate 36, bonding metal alloy 34 and flux 48 if used, with gas bag 40 welded in place, and the space 44 purged of air and water and filled with an inert gas is ready to be heated and rolled.

The subassembly is heated to 1650°-2100° F. in a typical mill slab furnace, thereby melting the bonding metal alloy. Hot rolling is performed in the customary manner, thereby affecting a metallic bond between plate 32 and cladding plate 12.

The pressure applied between plates to achieve liquid interface diffusion bonding by this process is substantially less than that required with present bonding techniques. The pressure between the plates need not be sufficient to cause plastic deformation of either plate 32 or 36.

Gas bag 40 remains with the subassembly during heating and rolling and receives all gas forced from space 44 between the plates as well as any excess bonding metal alloy. After heating and rolling to achieve liquid interface diffusion bonding the plate is finish rolled and cooled.

Gas bag 40 can be removed. Thereafter the clad plate can be trimmed, heat, treated, quenched and tempered as is routine in providing finished plates.

While the application of a cladding plate 36 to only one side of base plate 32 is shown and described it is apparent that the opposite surface of base plate 32 may be clad the same way, either simultaneously with the application of clad plate 36, or as a successive procedure and that the cladding plates may be of the same or different metals or metal alloys.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A method of manufacturing a clad metal plate product employing an rectangular metal base plate having four edges and first and second opposed surfaces, comprising:
    (a) plating the first surface of the base plate with a low melting point bonding metal alloy;
    (b) positioning a rectangular metal cladding plate having four edges and a first and second opposed surface juxtaposed to said base plate, the cladding plate first surface being contiguous to said low melting point bonding metal alloy plated on said base plate first surface;
    (c) welding three edges of said base plate to three corresponding edges of said cladding plate;
    (d) welding a gas bag to the fourth edges of said base plate and cladding plate to form a sealed subassembly;
    (e) evacuating the space between said base plate and said cladding plate first surfaces and charging it with inert gas by attachment of apparatus to said gas bag in a manner to substantially remove all water and oxygen and to leave the space filled with inert gas; and
    (f) heating the subassembly from about 1,650° F. to 2,100° F. and rolling the plates to force them into intimate contact with said bonding metal alloy therebetween.

2. A method according to claim 1 wherein step (e) includes charging said evacuated space with argon.

3. A method according to claim 1 where said base plate is of carbon steel.

4. The method according to claim 1 wherein in step (a) said low melting point bonding metal alloy is nickel-phosphorus composed of about 88 to 98 percent by weight nickel and about 2 to 12 percent by weight phosphorus.

5. The method according to claim 1 wherein step (a) includes submerging the base plate in an electroless bath.

6. The method according to claim 1 including the step of coating one of the surfaces of said base plate and cladding plate to be juxtaposed with a flux prior to step (b).

7. The method according to claim 6 wherein the flux is composed essentially of cryolite.

8. The method according to claim 1 wherein in step (a) the low melting point bonding metal alloy is composed of about 88 to 98 percent by weight nickel, about 2 to 12 percent by weight phosphorus and about 0.5 to 1 percent by weight boron.

9. The method according to claim 1 wherein said gas bag remains a part of the subassembly until the metallic bonding of the cladding plate to the base plate is completed.

10. The method according to claim 1 in which, after step (f) the base plate having the cladding plate metallically bonded thereto is sized and tempered to provide a finished plate.

11. The method according to claim 1 wherein step (e) includes evacuating the space between the base plate and cladding plate and charging it with an inert gas repeatedly until oxygen and water level remaining within the annular space is below a level expressed by a dewpoint of about −60° F.

12. The method according to claim 1 wherein in step (f) the subassembly is heated to about 1950° F.

13. The method according to claim 1 wherein in step (a) the surface at the base plate is plated with a low melting point bonding metal alloy selected from the group comprising nickel phosphorus, nickel boron, nickel chromium phosphorus, chromium phosphorus and mixtures thereof.

14. A method of manufacturing a clad metal plate product employing a metal base plate having a faying surface and an opposed surface, a cladding plate having a faying surface and an opposed surface; comprising
  (a) plating one of the faying surfaces with a low melting point bonding metal alloy;
  (b) assemblying the base plate and cladding plate one against the other so that their faying surfaces are juxtaposed;
  (c) sequentially evacuating and filling the space between the faying surfaces with inert gas until the water and oxygen within said space is at a level below a dew point of about −60° F.;
  (d) heating the assembled plates to the melting temperature of the bonding metal alloy; and
  (e) applying pressure between the assembled plates to bond the faying surfaces.

15. The method of claim 14 wherein step (e) is carried out by rolling pressure applied to the plates.

16. The method of claim 14 wherein step (a) includes plating one of the faying surfaces with a metal alloy having a melting temperature of between about 1650° F. and 2100° F.

17. The method of claim 14 wherein in step (a) said low melting point bonding metal alloy is nickel-phosphorus composed of about 88 to 98 percent by weight nickel and about 2 to 12 percent by weight phosphorus.

* * * * *